US00RE35412E

United States Patent [19]

Johnson et al.

[11] E Patent Number: Re. 35,412

[45] Reissued Date of Patent: Dec. 31, 1996

[54] DOUBLE TANK PINCH TRIGGER PUMP WATER GUN

[75] Inventors: Lonnie G. Johnson, Smyrna, Ga.; Bruce M. D'Andrade, Whitehouse Station, N.J.

[73] Assignee: Larami Limited, Mt. Laurel, N.J.

[21] Appl. No.: 296,438

[22] Filed: Aug. 26, 1994

Related U.S. Patent Documents

Reissue of:

[64] Patent No.: 5,150,819
Issued: Sep. 29, 1992
Appl. No.: 841,762
Filed: Feb. 28, 1992

U.S. Applications:

[63] Continuation of Ser. No. 680,247, Apr. 3, 1991, abandoned, which is a continuation-in-part of Ser. No. 578,145, Sep. 6, 1990, Pat. No. 5,074,437.

[51] Int. Cl.[6] ..... A63H 3/18

[52] U.S. Cl. ..... 222/79; 222/400.8; 222/401; 42/54; 273/349; 446/473

[58] Field of Search ..... 222/79, 130, 325, 222/396, 400.7, 400.8, 401; 42/54; 446/473; 273/349; 124/70, 73; 239/99; 141/25

[56] References Cited

U.S. PATENT DOCUMENTS

| | | | |
|---|---|---|---|
| D. 159,040 | 6/1950 | Bicos | 222/79 X |
| 2,049,194 | 7/1936 | Chapin et al. | 222/400.8 X |
| 2,589,977 | 3/1952 | Stelzer | 222/401 |
| 3,005,495 | 10/1961 | Herberg | 222/79 |
| 3,197,070 | 7/1965 | Pearl et al. | 222/79 |
| 3,578,789 | 5/1971 | Ferri | 222/79 |
| 4,214,674 | 7/1980 | Jones et al. | 222/79 |
| 4,441,629 | 4/1984 | Mackal | 222/396 X |
| 4,591,071 | 5/1986 | Johnson | 222/401 X |
| 4,630,757 | 12/1986 | Yano | 222/79 |
| 4,735,239 | 4/1988 | Salmon et al. | 141/25 |
| 4,743,030 | 5/1988 | Auer et al. | 222/79 |
| 4,757,946 | 7/1988 | Johnson | 239/99 |
| 4,854,480 | 8/1989 | Shindo | 222/79 |
| 5,029,732 | 7/1991 | Wong | 222/79 |
| 5,074,437 | 12/1991 | D'Andrade et al. | 222/79 |
| 5,184,755 | 2/1993 | Brovelli | 222/79 |
| 5,184,756 | 2/1993 | Amron | 222/79 |

FOREIGN PATENT DOCUMENTS

| | | | |
|---|---|---|---|
| 431955 | 7/1935 | United Kingdom | 222/79 |
| 669983 | 4/1952 | United Kingdom | 222/79 |

*Primary Examiner*—Gregory L. Huson
*Attorney, Agent, or Firm*—Kennedy & Kennedy

[57] ABSTRACT

The present invention is directed toward a toy water gun which is operated by selectively releasing water from a water reservoir pressurized with air. The present invention has a manually operated pump incorporated into the design. As the pump is cycled, water and air is drawn from a water storage tank. Once drawn, the water and air are forced into a pressure reservoir. As the amount of water and air forced into the pressure reservoir increases, the pressure on the water within the pressure reservoir increases. The pressure of the water and air within the pressure reservoir increases with each cycle of the pump, until the pump can no longer overcome the pressure of the water and air within the pressure tank. The pressurized water and air within the pressure tank has an avenue of release that is regulated by the trigger mechanism of the invention. When no force is applied to the trigger, the pressurized water and air are held at bay with no means of release. When force is applied to the trigger, the water is first released from the pressurized container and is channeled through a narrow nozzle. The escape of the water, under pressure, through the narrow nozzle creates a stream of propelled water that lasts as long as the trigger is engaged or until the air pressure propelling the water equals the ambient pressure.

26 Claims, 2 Drawing Sheets

DOUBLE TANK PINCH TRIGGER PUMP WATER GUN

Matter enclosed in heavy brackets [ ] appears in the original patent but forms no part of this reissue specification; matter printed in italics indicates the additions made by reissue.

REFERENCE TO RELATED CASE

This application is a continuation of U.S. Ser. No. 07/680,247 filed Apr. 3, 1991 now abandoned, which is a continuation-in-part of copending U.S patent application Ser. No. 07/578 145, filed on Sep. 06, 1990 now U.S. Pat. No. 5,074,437 by Bruce M. D'Andrade and Lonnie Johnson, inventors, entitled "Pinch Trigger Pump Water Gun".

BACKGROUND OF THE INVENTION

1. Field of the Invention

The present invention is directed toward a toy water squirt gun, and more particularly to such toy water squirt guns that use a self-contained pumping means to draw water from a storage reservoir, compress an air cushion with the drawn water, and store the water pressurized by the compressed air in a second pressurized reservoir. The water is then released in a selective manner through a narrow nozzle, causing the stored water to be propelled forward in a narrow stream. 2. Prior Art Statement Water guns have for decades been a very popular child's toy. Since the toy industry is very competitive, hundreds of different style water guns have been developed in an attempt to profit from the toy's inherent popularity. The most traditional forms of water guns are activated by a pumping action, either manually through the trigger or automatically through a battery operated motor. Such pump action water guns work, but the guns are limited in the distance the water traveled, the amount of water projected and the duration of the pumping cycle. In an attempt to improve upon water guns, the toy industry has developed pressure activated water guns. Such pressure water guns work upon the principle of pressure differentials between the water held within the toy and the atmosphere. The water within the toy is held at a pressure higher than that of the ambient air. As a result, when the water within the toy is given an avenue of escape, the water will stream out under the pressure. Prior art that shows pressure differential types of water guns are exemplified by the following:

U.S. Pat. No. 3,197,070 to Curtis F. Pearl et at, shows a water gun activated by trapping water in a collapsible area. As the device is collapsed, the pressure of the water builds, spraying the water out of the one small orifice left within the pressured volume. Once the confined volume is fully collapsed, the reexpansion of the volume draws forth more water from a reservoir, thus priming the water gun for another cycle. The water being pressurized is limited to the volume of the collapsible volume. The Pearl invention cannot store pressurized water for use at a later time, nor can the pressure of the water be increased by cycling the pumping action of the invention while restraining water discharge.

U.S. Pat. No. 4,854,480 to Robert S. Shindo and U.S. Pat. No. 4,735,239 to Michael E. Salmon et al, both show toy water devices that use an elastic bladder to pressurize water. The bladders are filled with high pressure water, and the bladders respond by elastically deforming. The source of pressurized water is then removed and the water within the expanded bladder is held in place by a clamping device activated by a trigger. The water gun is used by selectively releasing the water from the expanded bladder.

Water guns have also been developed that use air pressure to pressurize water and force water through squirt channels. Such toys that use air pumps to pressurize water are exemplified by the following:

U.S. Pat. No. 4,214,674 to Jones el al, shows a two piece apparatus consisting of a pressurized water reservoir and a discharging gun. Air is introduced into the water reservoir via a hand operated pump. The air pressurizes the water, forcing it up through the discharging gun, where the rate of discharge can be regulated by a trigger.

Thus, although prior art does show toy water guns that have collapsible water chambers and self-contained pumping means, prior art neither teaches nor suggests a toy water gun that uses a self-contained water pumping device to draw both water and air from a storage reservoir, pressurize air with the water drawn, and store the pressurized air and water in a second pressurized reservoir, where it can accumulate until discharged. Additionally, the safety of the invention is assured by a triggering device that automatically and safely discharges pressurized water when over pressurized, until the maximum allowable pressure is reached.

SUMMARY OF THE INVENTION

The present invention is directed toward a toy water gun which is operated by selectively releasing water from a pressurized water reservoir. The present invention has a manually operated pump incorporated into the design. As the pump is cycled, water and air is drawn from a water storage tank. Once drawn, the water and air are forced into a second pressure reservoir. As the amount of water and air forced into the pressure reservoir increases, the pressure of the air displaced by the water within the pressure reservoir increases. The pressure of the air and water within the pressure reservoir increases with each cycle of the pump, until the pump can no longer overcome the pressure of the air and water within the pressure tank. The pressurized air and water within the pressure tank has an avenue of release that is regulated by the trigger mechanism of the invention which has a safety pressure release within its design. When no force is applied to the trigger, the pressurized water and air are held at bay with no means of release. When force is applied to the trigger, the heavier water is first released from the bottom of the pressurized container and is channeled through a narrow nozzle. The escape of the pressurized water through the narrow nozzle creates a stream of propelled water that lasts as long as the trigger is engaged or until the pressure within the pressurized container equals the ambient air pressure.

BRIEF DESCRIPTION OF THE DRAWINGS

The invention will be more fully understood by referring to the following detailed specifications, the above specification and the claims set forth herein, when taken in connection with the drawings appended hereto, wherein:

DETAILED DESCRIPTION OF THE PRESENT INVENTION

Figure 1:
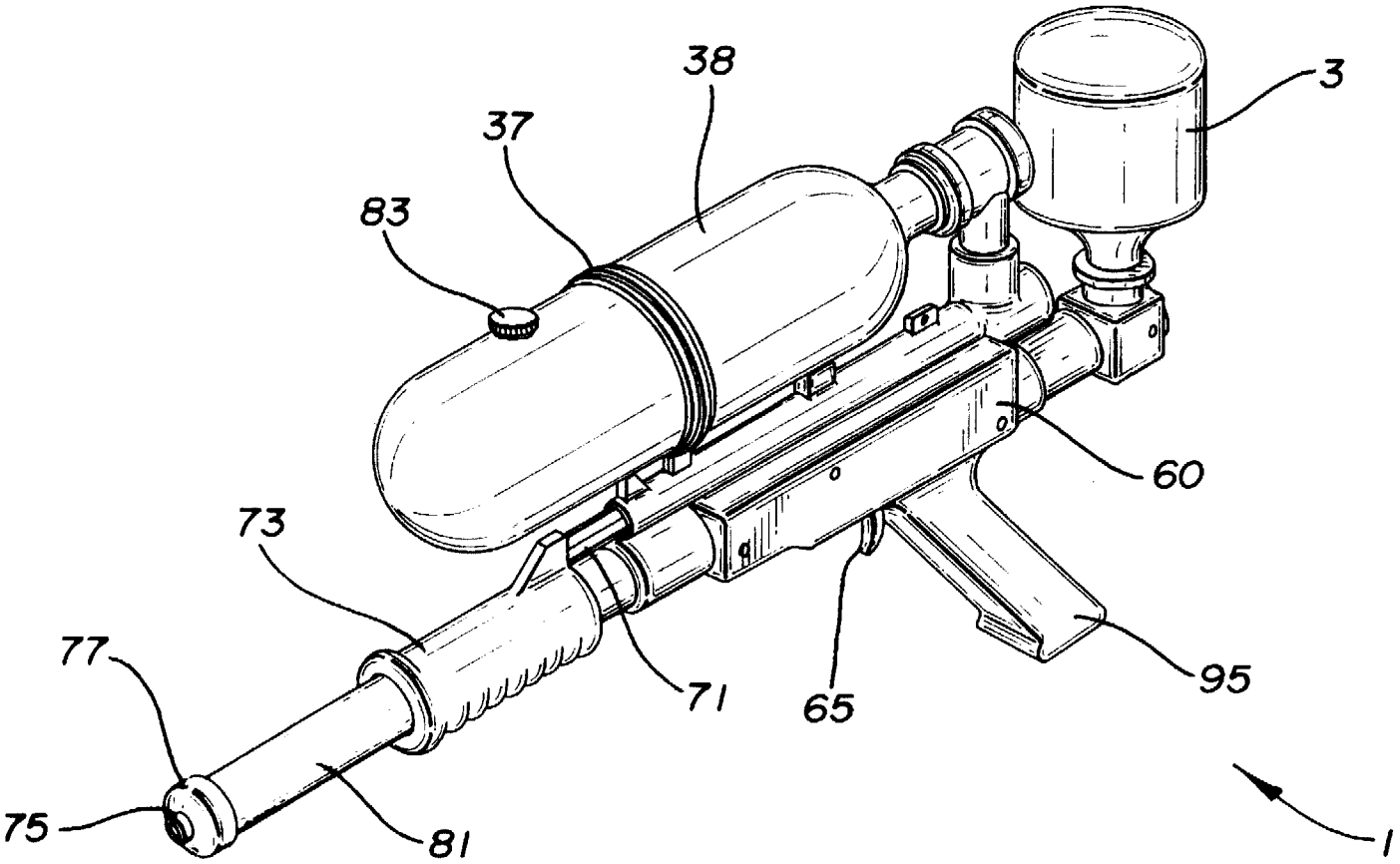
FIG. 1 shows a perspective view of one preferred embodiment to the present invention.

The present invention is, as mentioned, directed toward a toy water gun that uses a manually operated pump to draw and pressurize water and air, storing the water and air under pressure until selectively discharged. The science of pressurized water toys is not new, and over the years many different designs have been developed utilizing a pumping action to pressurize water. As applied to the art of toy water squirt guns, the most common type of device involves a two-stroke pump, wherein the pump draws water into a chamber through a large orifice during the priming stroke, and forces water out of the chamber through a very narrow orifice during compression stroke. This simple system forms the basis of thousands of devices in addition to water guns, such as non-aerosol dispensing devices for hair spray, perfume, window cleaner, and countless other products that are dispensed in a narrow stream or mist.

The problem with simple two-stroke squirting systems is that the amount of fluid that can be expelled is limited to the volume of the compressible area; also, the pressure of the liquid exiting the device is dependent directly upon the force being applied during the time of expulsion. Consequently, when water is squirted in this manner, only a small volume is released with each pumping action. When attempts are made to increase the amount of water propelled by increasing the volume of the compressible area, the pumping action cannot displace the water at a high pressure, resulting in expulsion of water at low pressures.

Water guns need the characteristics of squirting a large volume of water at high pressures. The higher the pressure, the longer the distance the water can be propelled, thus increasing the range and power of the water gun. The present invention water gun uses a common two-stroke pump to store and pressurize large amounts of water. The present invention draws predetermined volumes of water and air from a storage container, pressurizes air with the drawn water and deposits the pressurized air and water in a second storage tank, where it remains under pressure. As more and more water and air are drawn, pressurized and deposited within the second storage container, the volume and the pressure of the stored water increases, compressing the air within the second container. The water propelled by the compressed air can then be selectively released through a narrow orifice, creating a stream of propelled water. The double tank system of the present invention allows the user of the invention to determine the volume and pressure of the water to be discharged, and also allows a user to refill and replace the non-pressurized water storage tank without disabling the water gun's ability to discharge water. The double tank system gives water guns a variety of firing characteristics that is unique in the art of toy water guns, allowing an operator to choose and adjust the range and power of the water gun.

The present invention also has other advantages over other pressurized container water guns, in that, instead of pumping only air into a chamber that already contains water, the present invention pumps water into a chamber which is filled with air. The pumping of water is more efficient than the pumping of air, thus less pumping strokes are required and higher pressures are easier to achieve.

Figure 2:
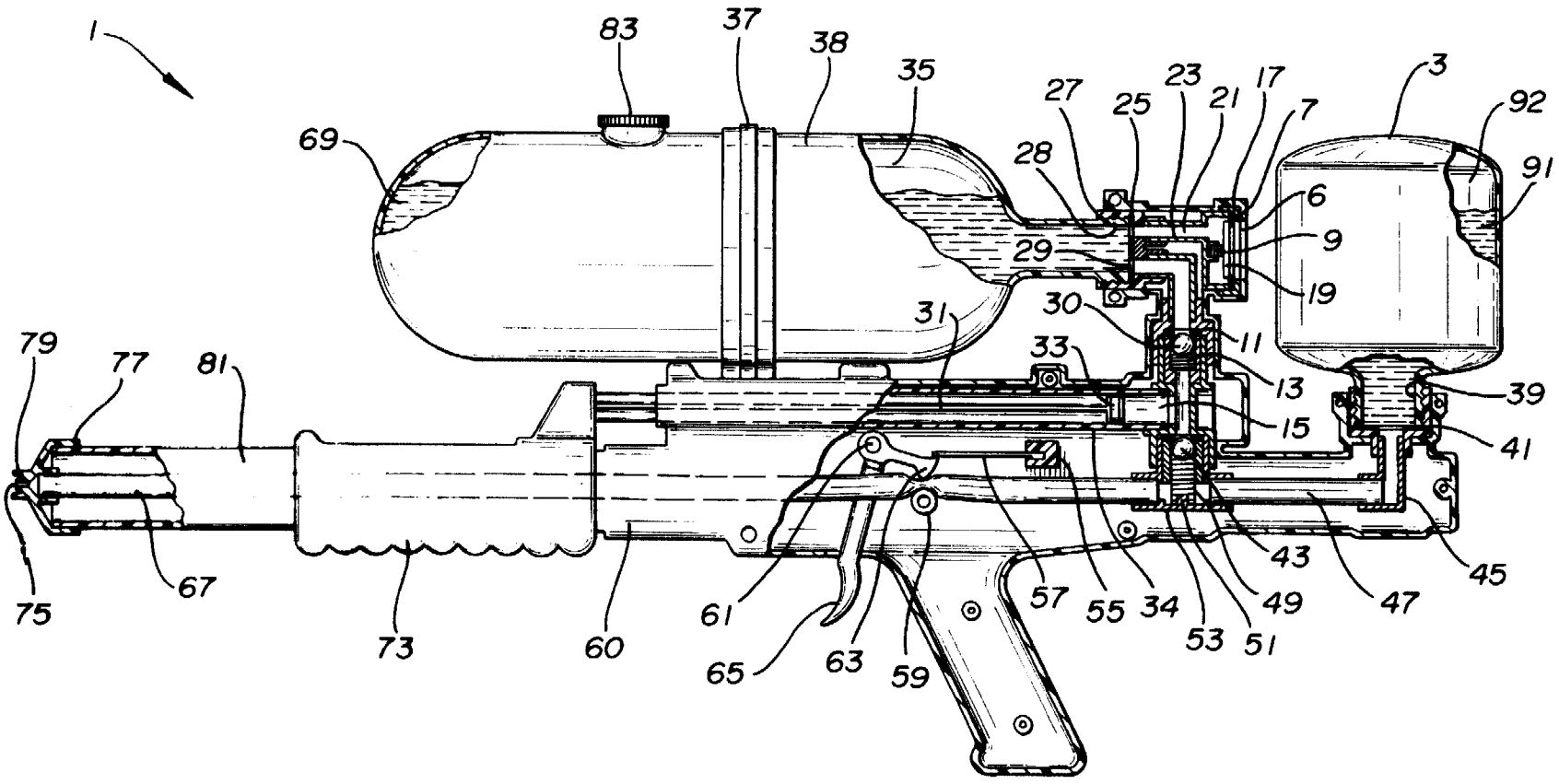
FIG. 2 shows a partially fragmented side view of the embodiment depicted in FIG. 1, illustrating the claimed inner mechanisms.

When designing toys involving pressurized air and water, the problem becomes one of safety. Toys are designed to be inexpensive so as to be widely marketable. As such, most toys are made of plastics or other inexpensive materials. Such materials do not have large tensile strengths or fatigue characteristics, and therefore do not lend themselves well to containing pressurized fluids. Plastic containments of pressurized liquids, if not properly designed, can rupture and explode, causing injury. The present invention has a unique design that allows for both the use of high pressure air and the elimination of potential rupturing hazards. The present invention has a cylindrical pressurized reservoir with a single opening. The single orifice, in conjunction with the generous radii used at the cylinder ends, serve to maintain the integrity of the water reservoir walls and minimize the stress points throughout the material of the pressurized reservoir, thereby allowing for the safe use of pressures generated by the present invention. Referring now to FIGS. 1 and 2, one preferred embodiment of the present invention 1 is shown. FIG. 1 shows a perspective view of the present invention 1 and FIG. 2 shows a fragmented side view of the present invention, exposing the internal mechanisms with like parts being like numbered. As shown from FIGS. 1 and 2, the embodiment shown of the present invention has two tanks, a water storage tank 38 and a pressurized tank 3. Both tanks 38, 3 attach to a main housing 60 that is shaped generally in the form of a gun having a handle 95, trigger 65 and barrel 81. The water storage tank 38 is held firmly to the housing 60 with a hoop 37. The hoop 37 minimizes the stresses on the tapered neck of the storage tank 38 as the water 69 within shifts during movement.

Referring now solely to FIG. 2, the inner workings of the present invention 1 can best be visualized and explained. Water 69 is placed within water storage tank 38. The water 69 is introduced in one of two ways. First, the water 69 can be poured through the optional filling cap 83, or the water storage tank 38 can be removed from the housing 60 and water can be poured through the neck opening of the storage tank 38. The water storage tank 38 is shown in FIG. 2 as being bottle shaped, with a neck terminating in a threaded head 28. The storage tank 38, in the shown embodiment, screws into the housing 60. However, it should be understood that the storage tank 38 can be formed unistructurally with the housing 60, and if so formed, the optional filling cap 83 would become a necessary part of the design. It should also be understood that the storage tank 38 can be formed in any shape or size, as long as the design holds and stores water.

Water 63 and air 35 are drawn from the storage tank 38 through an orifice 29 that connects with the storage tank 38. The invention will draw either water 63 or air 35 from the storage tank 38, depending on the orientation of the invention when the operator draws materials from the storage tank 38. As water 69 or air 35 are taken from the storage tank 38, a partial vacuum is produced within. The vacuum is eliminated by a vent valve 19 that allows air 35 to enter into the storage container 38 as the vacuum develops. The vent valve 19 is biased by a spring 9 in the closed position, preventing water from escaping, and an optional elastomeric washer 7 helps seat the vent valve 19, enhancing its ability to prevent the escape of water. It should be understood that although a vent valve 19 is the best mode of the invention. the invention may function without such a valve so long as the storage container has an open vent to the ambient air. Similarly, an elastomeric seal 25 can be used to help seat the water storage tank 38 against the housing 60, the elastomeric seal having an orifice therethrough, allowing for the passage of the draw tube 29 and the vacuum venting passage 21.

The force drawing the water 69 or air 35 from the storage tank 38 is created by the movement of the piston 33 within its cylinder 34. The movement of the piston 33 within the cylinder 34 has two-cycle strokes, a priming stroke where water 69 or air 35 are drawn forth from the water storage reservoir 38, and a compression stroke wherein water 69 or air 35 are displaced by the piston 33. The priming stroke starts when the piston 33 is retreated within its cylinder 34, creating a large volume chamber 15. The vacuum created by the expanding chamber 15, draws water 69 or air 35 through the draw tube 29 and into the chamber 15. The flow of water 69 or air 35 into the expanding chamber 15 opens a one-way valve that is normally biased in a closed position. The one-way valve that is shown in FIG. 2 consists of a ball 30 that is biased against an elastomeric seal 11 by a spring 13. As a vacuum is created by the piston 33, the force of the spring 13 is overcome and the ball 30) drops away from the elastomenc seal 11, allowing water 69 or air 35 to pass. As the piston 33 is advanced within its cylinder 34, the compression stroke begins and water 69 or air 35 now within the chamber is compressed, closing the one-way valve by assisting the spring 13 to push the ball 30 against its seal 11. Although a ball and seal one-way valve is illustrated, it should be understood that any design of a one-way valve would work within the present invention as long as the valve made a seal that is both air and water tight.

The compression stroke created by the advancement of the piston 33 within the cylinder 34 causes the water 69 or air within the chamber 15 to become pressurized. The water 69 or air 35, as a result of the diminishing volume of the chamber 15, opens a second one-way valve that leads to the pressurized storage tank 3. As the piston 33 is reciprocated within its cylinder 34, water 69 or air 35 is repeatedly drawn from the storage tank 38 and deposited into the pressurized storage tank 3. As more and more water 69 or air 35 is drawn and forced into the pressurized storage tank 3, the pressure with tank 3 increases until the force used to drive the piston 33 can no longer overcome the stored pressures, or until the pressure is released through the safety trigger 65.

The movement of the piston 33 within cylinder 34 draws water 69 or air 35 from storage tank 38 through an orifice 29. However, when the storage tank 34 is positioned so that the air 35 within the storage tank 38 is in contact with the orifice 29, the movement of the piston 33 will draw air 35 into the pumping chamber 15. When the pumping chamber 15 is compressed, the air 35 will become pressurized and flow into the pressurized storage tank 3, forming an air cushion, while not increasing the pressure of any water 91 present within the pressurized storage tank 3. By having a pumping action that can introduce both air 92 and water 91 into the pressurized storage tank 3, the pressure of the air 35 can be increased above that available by an air pumping system alone because of the inefficiency of a normal hand pump. The pumping of water 91 is more efficient than that of air 92 because of the incompressibility of liquids, therefore the work available from the pumping system is maximized when used to pump water against an air cushion.

The operation of the pumping action is achieved by the piston 33 being driven by a piston rod 31 that is affixed to a handle 73. The handle 73, as shown in this embodiment, is slidably attached to the barrel 81. As the handle 73 is manually reciprocated along the barrel 81, the motion is transferred to the piston 33, creating the desired pumping effect. Although a linear pumping action is shown, it should be understood that a variety of orientations and multiple linkage configurations could be manipulated by a user to create the desired pumping motion.

Once the desired pressure is obtained within the pressurized tank 3, the water 91 stressed by the compressed air 92, is discharged by selectively opening an exit orifice to the surrounding ambient air. The pressure differential between the ambient air and the water 91 causes the water 91 to stream out. In the shown embodiment of the present invention, the pathway connecting the pressurized tank 3 to the ambient air is a pair of tubes, a flexible exit tube 67 and a pump connection tube 47. As water or air leaves the pumping chamber 15, it passes by a one-way valve 43 and into a T-shaped connection 53. The T-shaped connection 53 on one side attaches to the flexible exit tube 67, and on the other side attaches to connection tube 47. As water or air is forced into the T-shaped connection 53, the water or air tries to enter both the exit tube 67 and the connection tube 47. However, the exit tube 67 is closed by the trigger pinch bar 63, leaving the connection tube 47 as the only pathway through which the water may pass. The connection tube 47 leads to the pressure tank 3, consequently all or air water expelled by the pump is led into the pressure tank 3. When pressurized water 91, stored within the pressure tank 3 is to be discharged, the trigger 65 is depressed. The trigger 65 is formed with a pinch bar 63 that is biased against the exit tube 67 by a spring 57. As the trigger 65 is depressed, the bias of the spring 57 is overcome and the pinch bar 63 is lifted away from the exit tube 67. With the exit tube 67 open, the integrity of the pressure tank 3 is now breached and the pressurized water 91 is offered an avenue of escape to the ambient air. The pressure differential between the pressurized water 91 and the ambient air causes the water 91 to flow back out through the connection tube 47, through the T-shaped connection 53 and through the exit tube 67, until the water 91 is discharged through the exit orifice 75 formed at the end of the exit tube 67.

The amount of pressurized water 91 being discharged through exit orifice 75 is controlled by the user in a variety of ways. A user can control the amount of water discharged by controlling the depression of the trigger 65. If the trigger 65 is depressed and left in that position, the pressurized water 91 will be discharged until the pressure tank 3 is empty, or until the pressure of the compressed air 92 equals that of the ambient air. The user may choose to discharge the pressurized water 91 selectively, depressing the trigger 65 for short periods of time, resulting in numerous shots being allowed before the pressure tank 3 needs to be refilled. A user may also choose to vary the pressure and amount of water being discharged by selectively adding the air 92 within pressure tank 3. The more water 91 or air 92 is added, the higher the pressure and the farther and longer the invention may propel water.

As mentioned, the present invention water gun is operated by selectively releasing the pressurized water 91 through a narrow nozzle 75. The selective release of the pressurized water is controlled by the trigger mechanism of the water gun. Since the present invention has the ability to operate at high pressures, the trigger release mechanism performs two functions. First, it controls the amount of water released, and second, the trigger mechanism serves as a safety valve. The trigger 65 of the present invention has a pinch bar extension 63 that pinches the exit hosing 67 for the pressurized water 91 against a stop 59 that is part of the main housing.

The pinch bar 63 is biased against the stop 59 by a calibrated spring 57. The spring 57 is held at one end by a formation 55 of the main housing. The strength of the spring 57 in its biased configuration is calibrated, so that when the pressure of water 91 within the exit tubing 67 reaches a predetermined maximum valve, the spring 57 will allow the pinch bar 63 to rise and water 67 will be released until a safe pressure is maintained.

FIGS. 1 and 2 show only one embodiment of the present invention, and although these figures show the best mode of the invention, it should be understood that the present invention can be practiced in many forms other than that shown. The basis of the present invention is a double tank design that uses a manual water pump and a series of one-way valves and tubes to draw ambient water from one tank, pumping said water into a second tank, where it is presssurized against an air cushion and discharge that water selectively to the ambient air. The illustrated embodiment shown in FIGS. 1 and 2 shows a design for the present invention that is both efficient and inexpensive to manufacture. It should therefore be understood that in light of the appended claims, the invention may be practiced other than is specifically described, and individual parts may be modified or connected in orientations other than those shown.

What is claimed is:

1. A toy water gun having a housing with extending handle trigger and barrel, said water gun comprising:

(a) a water storage reservoir connected to said housing, said water storage reservoir having at least one orifice formed thereon for the addition and subtraction of water therefrom; and said water storage reservoir having at least one vent to the surrounding ambient air;

(b) a pressurized water storage tank connected to said housing, said pressurized water storage tank having only one orifice through which all liquids and gasses pass;

(c) a pumping means that can selectively draw air or water or a combination thereof from said vented water storage reservoir, depositing same into said pressurized water storage tank to thus vary the ratio of air to water therein;

(d) a plurality of one-way flow valves, wherein at least one of said one-way flow valves prohibits water and air from flowing from said pressurized water storage tank to said pumping means and another at least one of said one-way flow valves prohibits water and air from flowing from said pumping means to said water storage reservoir;

(e) a nozzle having a narrow orifice therethrough, said nozzle being affixed to the end of said barrel;

(f) an avenue of release connecting said nozzle to said pressurized water storage tank; and (g) a controlling means for regulating the flow of water and air through said avenue of release, said controlling means being attached to said trigger of said water gun and regulated by the movement of said trigger.

2. The water gun of claim 1, whereto a one-way venting valve allows ambient air to enter said water storage reservoir through said vent while preventing water from exiting said water storage reservoir through said vent.

3. The water gun of claim 1, wherein said pumping means is the reciprocation of a piston within a cylinder, said reciprocation of said piston having two-cycle strokes, a priming stroke whereto said piston retreats within said shaft, and a compression stroke wherein said piston advances within said shaft.

4. The water gun of claim 3 wherein said piston is affixed to a rod, said rod terminating at a handle.

5. The water gun of claim 3 wherein said priming stroke of said pumping means draws water or air into said cylinder from said water storage reservoir, past at least one said one-way flow valves.

6. The water gun of claim 5 wherein said compression stroke of said pumping means forces said water or said air, drawn from said water storage reservoir, out of said cylinder and into said pressurized water storage tank.

7. The water gun of claim 4 wherein said handle is slidably affixed to said barrel.

8. The water gun of claim 1 wherein said avenue of release is a flexible tube.

9. The water gun of claim 1 wherein the level and orientation of water within said water storage reservoir determines whether said pumping means draws water or air from within said water storage reservoir.

10. The water gun of claim 9 wherein a user of said gun can selectively draw air or water from said water storage reservoir with said pumping means by changing the orientation of said gun.

11. The water gun of claim 8 wherein said controlling means for regulating the flow of water through said avenue of release is a spring biased pinch bar that presses a length of said avenue of release against said housing of said water gun, collapsing said length of said avenue of release.

12. The water gun of claim 11 wherein said spring bias of said pinch bar is overcome by a force applied to said trigger, whereby said pinch bar is formed as part of said trigger and said force applied to said trigger through a lever action, causes said pinch bar to move in opposition of said spring bias.

13. The water gun of claim 1 wherein said water storage reservoir is detachable from said gun.

14. The water gun of claim 11 wherein said spring bias is created by a leaf spring having one end affixed to said housing of said gun.

15. The water gun of claim 2 wherein said one-way venting valve opens each time the air pressure within said water storage reservoir is less than that of the ambient air.

16. The water gun of claim 1 wherein said pressurized storage tank can safely hold water or air at a pressure of at least one hundred pounds per square inch.

17. The water gun of claim 1 wherein said water storage reservoir has a sealable orifice thereon for the addition of water thereto.

18. The water gun of claim 13 wherein water stored within said pressurized water storage tank can be discharged from said gun while said water storage reservoir is detached from said gun.

19. The water gun of claim 11 wherein said spring bias pinch bar is calibrated to yield to pressure within said avenue of release, when said pressure within said avenue of release exceeds a predetermined maximum value.

*20. A toy water gun comprising a storage reservoir adapted to hold water and air, said storage reservoir having a vent which allows air to enter said water storage reservoir; a pressure tank adapted to hold water and air; first conduit means for conveying water or air from said storage reservoir to said pressure tank, said first conduit means being coupled with said storage reservoir in a position so that the orientation of water within the storage reservoir determines whether water or air is drawn from within said storage reservoir; drawing means for selectively drawing air or water or a combination of air and water from said storage reservoir and depositing the drawn air or water or combination thereof into said pressure tank through said first conduit means; second conduit means for conveying water from said pressure tank to ambience; and control means for controlling the flow of water through said second conduit means.*

*21. The toy water gun of claim 20 wherein said drawing means comprises a pump.*

*22. The toy water gun of claim 20 wherein said second conduit means includes a nozzle.*

*23. A toy water gun comprising a housing; a storage reservoir adapted to hold a combination of water and air, said storage reservoir being removably mounted to said housing; a pressure tank adapted to hold a combination of water and air; first conduit means for conveying water or air from said storage reservoir to said pressure tank; pump means for selectively pumping water or air into said pres-*

*sure tank from said storage reservoir to vary the air to water ratio therein and thereby increase pressure of air exerted upon the water by compression of the air; second conduit means for conveying water from said pressure tank to ambience, and control means for controlling the flow of water through said second conduit means.*

*24. The toy water gun of claim 23 wherein said water storage reservoir has a vent which allows air to enter said water storage reservoir from ambience.*

*25. The toy water gun of claim 23 wherein said second conduit means includes a nozzle.*

*26. The toy water gun of claim 23 wherein said first conduit means is coupled with said storage reservoir in a position so that the orientation of water within said storage reservoir determines whether said pumping means draws water or air from within said storage reservoir.*

* * * * *